United States Patent [19]

Scardovi

[11] Patent Number: 4,498,089

[45] Date of Patent: Feb. 5, 1985

[54] CONTROL SYSTEM FOR INK JET PRINTING ELEMENT

[75] Inventor: Alessandro Scardovi, Ivrea, Italy

[73] Assignee: Ing. C. Olivetti & C., S.p.A., Ivrea, Italy

[21] Appl. No.: 514,304

[22] Filed: Jul. 15, 1983

[30] Foreign Application Priority Data

Jul. 16, 1982 [IT] Italy .............................. 67907 A/82

[51] Int. Cl.[3] .............................................. G01D 15/16

[52] U.S. Cl. ................................ 346/140 R; 310/317; 310/326

[58] Field of Search .................... 346/140 R; 310/317, 310/326

[56] References Cited

U.S. PATENT DOCUMENTS

| | | | |
|---|---|---|---|
| 3,029,356 | 4/1962 | Renaut | 310/326 X |
| 3,532,911 | 10/1970 | Roberts | 310/326 X |
| 4,369,455 | 1/1983 | McConica | 346/140 R |
| 4,459,599 | 7/1984 | Ort | 346/140 R |

*Primary Examiner*—Joseph W. Hartary
*Attorney, Agent, or Firm*—Banner, Birch, McKie & Beckett

[57] ABSTRACT

The control system is applied to an ink jet head in which the individual drops of ink are expelled from a container by way of a nozzle by the effect of contractions of a piezoelectric transducer applied to the container. The transducer is included in an oscillatory circuit which is normally connected to a dc voltage source. A pulse generator acts on a switch to generate a voltage wave in the oscillatory circuit of the transducer and interrupts the pulse when the current in the oscillatory circuit goes to zero, whereby a single voltage wave with a low harmonics content is generated. The oscillatory circuit is so designed that the frequency spectrum created by the voltage wave drops rapidly with frequencies higher than the resonance frequency of the oscillatory circuit and has at least one node close to the resonance frequency at the lowest nodal diameter mode of vibration of the meniscus.

25 Claims, 8 Drawing Figures

CONTROL SYSTEM FOR INK JET PRINTING ELEMENT

BACKGROUND OF THE INVENTION

The present invention relates to a control system for a selective ink jet printing element operating through a nozzle of a container provided with a piezoelectric transducer which is capable of compressing or expanding the container when subjected to predetermined voltages. The system is of the kind which comprises an oscillatory circuit which includes the transducer and is normally connected to a dc voltage source and an arhythmic pulse generator for selectively exciting said oscillator circuit.

Control circuits for transducers of selective ink jet printing elements are known, in which a pulse generator is arranged to act on the circuit in such a way as to produce, at the transducer, a variation in voltage such as to expel a droplet. In a known circuit arrangement, the transducer (which appears electrically as a capacitance) is included in a damped oscillatory circuit in which the constant-duration pulse from the generator forms a complex voltage wave, with a rapid rise and a slow fall, which reduces the maximum printing frequency. In addition, such a wave is affected by harmonics associated with the resonance frequency of the control circuit, which give rise to oscillations at the meniscus of the ink in the nozzle, whereby the characteristics of the droplet depend on the moment at which it is discharged.

In another known circuit, the oscillatory circuit of the transducer is a parallel resonant circuit which comprises the secondary winding of a transformer, whereby the transducer is normally completely de-energised. The constant-duration pulse of the generator produces, in the oscillatory circuit, a voltage wave which oscillates about the value zero, followed by damped secondary waves which maintain the meniscus in an agitated condition. In order to allow these waves to die away sufficiently it is necessary in this case also to reduce the maximum frequency of printing.

In addition, the oscillatory circuit being of parallel-type, that circuit will generate a pressure wave with a very high proportion of frequency harmonics higher than its resonance frequency, which will excite the frequency at nodal diameters of the meniscus and give rise to interference in the discharge of the ink drops.

SUMMARY OF THE INVENTION

The object of the present invention is to provide a control system for ink jet printers, with a high rate or repetition, without the parasitic oscillations which interfere with emission of the drops of ink.

It is another object of the present invention to provide a control system for ink jet printers wherein the frequency spectrum of the pressure wave falls rapidly for frequencies higher than the resonance frequency of the oscillatory circuit.

Other characteristics of the invention will appear clear from the following description and as set forth in the appended claims.

BRIEF DESCRIPTION OF THE DRAWINGS

The invention will be described in more detail, by way of example, with reference to the accompanying drawings, in which.

DETAILED DESCRIPTION OF THE PREFERRED EMBODIMENTS

The ink 1 which is contained under atmospheric pressure in a container 3 (see FIG. 1) forms a meniscus 5 in the nozzle 7 (FIG. 2), which is defined by a concave surface 5*a* in a condition of equilibrium between the surface tension of the ink 1 and hydrostatic pressure. When the ink 1 is subjected to variations in pressure, the meniscus 5 can vibrate in accordance with certain natural resonance frequencies $f_1$, $f_2$, $f_3$ . . . , the values of which are approximately multiples of the fundamental frequency $f_1$. At the fundamental frequency, the meniscus vibrates in the mode referred to as the 'nodal circle' type, in which the shape of the surface 5*a* goes alternately from convex to concave, while remaining symmetrical with respect to the axis of the nozzle and anchored at the coincident nodal circle at the circumference of the nozzle 7. That form of vibration is the most suitable for the selective formation of drops of ink which are of the maximum volume compatible with the energy transmitted to the ink 1 in the container 3 and are discharged in a direction parallel to the axis of the nozzle 7.

Figure 5:
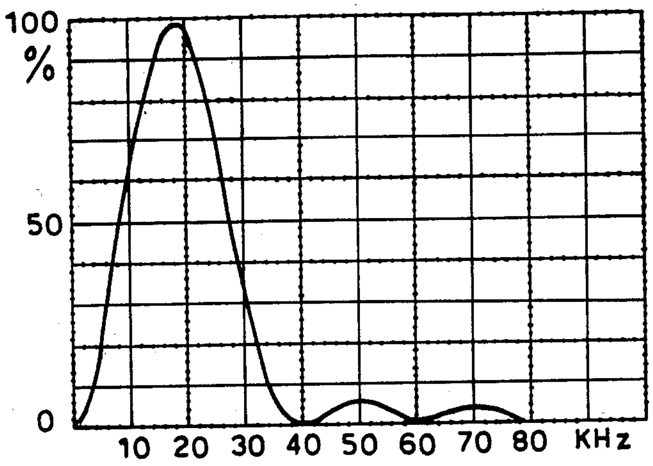
FIG. 5 shows the spectrum of the oscillations produced by the circuit shown in FIG. 3.

A second mode of vibration, referred to as the 'nodal diameter' type, occurs at the second resonance frequency $f_2$ which is approximately twice the value of the fundamental frequency. In accordance with the nodal diameter vibrations, the surface of the meniscus 5 assumes the shape shown at 5*b* having two antinodes which are respectively concave and convex, and a node disposed on a diameter of the nozzle 7. The drops discharged are smaller in volume than the maximum and are dispatched in an uncontrollable manner in divergent directions with respect to the axis of the nozzle. At odd harmonics of the fundamental frequency, the meniscus 5 always vibrates in the nodal circle mode, having a plurality of nodes on circles which are concentric to the axis of the nozzle. In those modes of vibration, multiple drops (satellites) of small volume can easily be formed, such multiple drops being discharged in a disorderly manner into the space enclosed in a cylinder which is equal in diameter to the diameter of the nozzle. In FIG. 5, 5*c* indicates the shape of the meniscus 5 when it vibrates at a frequency $f_3$ which is about three times the fundamental frequency $f_1$.

It will be seen from the foregoing that, in order selectively to emit the drops of ink in a constant volume and in a fixed direction from a nozzle as at 7 (see FIGS. 1 and 2), it it necessary to apply to the container 3 a compression pulse having a frequency spectrum of maximum amplitudes within the fundamental frequency $f_1$ of the meniscus 5 and with minimum or zero amplitudes within the nodal diameter vibration frequency $f_2$.

The head 9 (see FIG. 1) comprises the container 3 which is filled with ink 1 and which is provided at its end with a nozzle 7. A piezoelectric transducer of biased type, of a sleeve-like configuration, is rigidly fitted on the container 3. As is known, when the transducer 10 has applied thereto a voltage which is of the same sign as its bias, for example positive, the transducer contracts, causing a reduction in the internal volume of the container 3. In contrast, when a voltage of opposite sign is applied, the transducer 10 expands, causing an increase in the internal volume of the container 3 which is normally of tubular shape.

Figure 3:
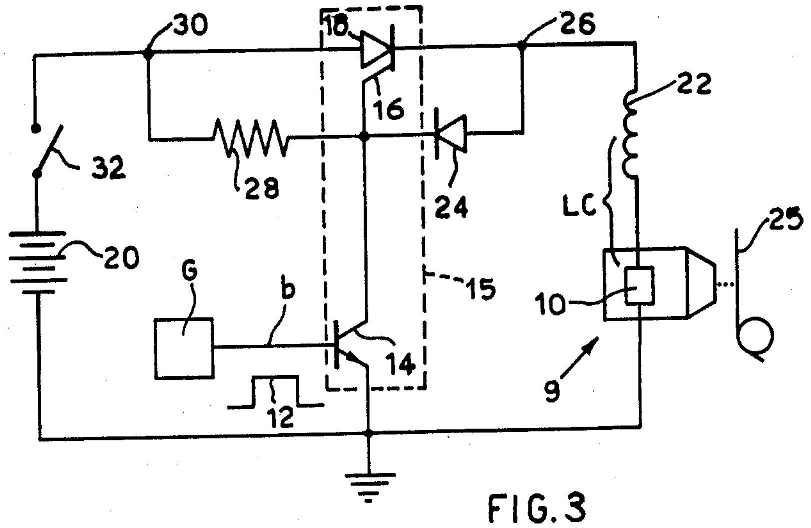
FIG. 3 is a circuit diagram of a control system embodying the invention.

Referring to FIG. 3, the control circuit embodying the invention is activated by a print pulse 12 generated by a logic circuit of known type, which is diagrammatically indicated by G. The pulse 12 has very rapidly rising and falling edges and is of a predetermined duration $T_c$, depending on the characteristics of the control circuit, as will be described in greater detail hereinafter. The generator G is connected to an electrode b of an electronic switch 15 which comprises a transistor 14, a controlled diode 18, a control electrode 16 of which is connected to the collector of the transistor 14. The diode is connected in series in a direct line between a source 20 of dc voltage $V_A$, to the piezoelectric transducer 10, by way of an inductor 22 disposed between the diode 18 and the transducer 10. The inductor 22 and the capacitance of the transducer 10 form a series-type LC oscillatory circuit, i.e. a resonant circuit. The electronic switch 15 selectively connects the LC circuit to the d.c. source 20 or to ground, as hereinafter described.

A diode 24 is connected between the control electrode 16 and a common point 26 between the diode 18 and the inductor 22, to permit the capacitance of the transducer 10 to be discharged when the transistor 14 is in a conducting condition.

A resistor 28 is connected between the electrode 16 and a point 30 which is common between the source 20 and the diode 18 and serves as the load resistance for the transistor 14, as the biasing resistance for the control electrode 16 of the diode 18 and as the damping resistance for discharging the capacitance of the transducer 10 at the end of each cycle of discharging a drop of ink from the head 9.

When the source 20 (see FIG. 3) is connected to the control circuit by means of a switch 32, the controlled diode 18 is activated by the current flowing in the resistor 28 and the control electrode 16. The diode 18 therefore conducts and the current flowing therethrough charges up the capacitance of the transducer 10 to the voltage $V_A$ of the source 20. At that point, the diode 18 automatically switches off because the current no longer flows therethrough. Since the transducer 10 is charged up to the voltage $+V_A$, it partially compresses the container 3. In actual fact, the voltage $V_A$ of the voltage source is selected to be equal to about 20% of the maximum voltage which the transducer can withstand. From that moment, the control circuit is ready to receive the print pulses 12 for printing on a carrier 25. When, at an indefinite time $T_o$, the generator circuit G applies a pulse 12 to the electrode b, i.e, to the base of the transistor 14, the transistor 14 conducts, shorting circuiting the circuit LC, for the entire duration $T_c$ of the pulse 12. The diode 18 remains switched off by virtue of the negative voltage at its control electrode 16, produced by the current which passes through the diode 24. A harmonic oscillation is started in the oscillator circuit LC, during which, in a first phase of a duration $T_1-T_o$ corresponding to a half-period of the oscillation, the energy which was previously stored in the capacitance of the transducer 10 is discharged, generating a current I which passes through the inductor 22, the diode 24 and the transistor 14. The configuration of the current I (see FIG. 4) assumes the form of a negative sinusoidal half-wave which passes through zero at time $T_1$. Correspondingly, the voltage $V_c$ at the ends of the capacitance of the transducer 10 assumes the configuration of a sinusoidal half-wave 36 of the oscillation of the oscillation circuit LC, having the same half-period $T_1-T_o$ as the current I. The half-period $T_1-T_o$ depends on the values of the inductor 22 and the capacitance of the transducer 10, in accordance with the following approximate expression:

$$(T_1 - T_o) \cong \pi \cdot \sqrt{LC}$$

in which L is the inductance of the inductor 22 and C is the capacitance of the transducer 10. The above expression is approximate because it does not take account of the inherent resistance at the inductor 22, insofar as that resistance makes a negligible contribution to the value of the half-period $T_1-T_o$, in comparison with the values of L and C which are actually employed. In fact, in accordance with one embodiment of the circuit shown in FIG. 4, the values of L and C are respectively 13 mH and 5 nF, while the inherent resistance of the inductor 22 is 13 Ω.

With such values, the half-period $T_1-T_o$ is about 25 μsec.

The voltage $V_c$ at the ends of the transducer 10 gradually changes from the value $V_A$ to a minimum value $-V_A$, which it reaches at the time $T_1$. That reduction in voltage $V_c$ produces expansion of the container 3, which promotes the suction intake of a small amount of ink from a reservoir 8 which is diagrammatically indicated in FIG. 1 and to which the container 3 is connected. The pulse 12 is automatically interrupted at the time $T_1$ by the generator G which is suitably controlled. At the same time, the transistor 14 switches off and the current which flows through the resistor 28 to the electrode 16 causes the diode 18 to conduct, thereby substantially establishing a short-circuit condition between the points 30 and 26. Consequently, the voltage source 20 is directly connected to the oscillator circuit in which the previously initiated oscillation is thus maintained. The voltage $V_c$ at the ends of the transducer 10 therefore continues its oscillation, going continuously from the value $-V_A$ to a maximum positive value of about 3 $V_A$, in a second phase of the oscillation which is of a duration $T_2-T_1$. Since the values of L and C are unchanged, the duration $T_2-T_1$ will be equal to a half-period of the oscillation of the voltage $V_c$, calculated as above. Therefore, the duration $T_2-T_1$ of the second phase will be equal to the duration $T_1-T_o$ of the first phase.

The characteristic of the voltage at the ends of the transducer 10 corresponds to a sinusoidal half-wave 38 between the negative peak $-V_A$ and the positive peak $3V_A$. The current I in the transducer 10 increases from zero at time $T_1$ to a maximum, to fall to zero again at the time $T_2$, with a sinusoidal characteristic. Since the diode 18 is switched into the conducting condition at time $T_1$ at which the current I is zero, the voltage $V_c$ at the ends of the transducer 10 varies continuously at the time $T_1$ without giving rise to parasitic oscillations at higher frequencies. Under the action of the variation in the voltage $V_c$ from the value $-V_A$ to the value $+3V_A$, the transducer 10 rapidly compresses the container 3, causing a single drop of ink to be discharged from the nozzle 7, that drop of ink being projected against the carrier 25 (see FIG. 3) on a constant trajectory which is coaxial with respect to the axis of the nozzle 7.

At the time $T_2$ when the current I goes through zero, the diode 18 is automatically de-energised. At the same time, the diode 24 begins to conduct, thereby permitting the current I to flow through the resistor 28 in the opposite direction to the previous direction, for a period of time $T_3-T_2$, during which the oscillation of the voltage $V_c$ at the ends of the transducer 10 is completed.

Figure 4:
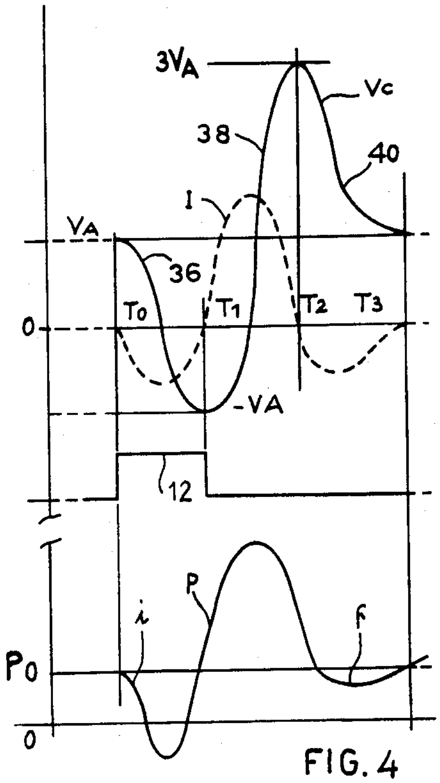
FIG. 4 is a graph showing the wave form in the circuit of FIG. 3.

In the period of time $T_3-T_2$, the voltage $V_c$ continuously falls from the value $+3V_A$ to the rest value $+V_A$, with a characteristic which is shown by the line 40 in FIG. 4, having the form of damped sinusoidal oscillation, by virtue of the resistance 28 being connected in series with the diode 24.

Figure 6:
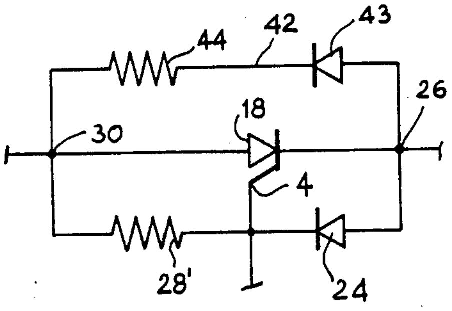
FIG. 6 is a view of part of an alternative embodiment of the circuit shown in FIG. 1.

The resistance 28 must be of a relatively high value in order not to dissipate excessive energy when it operates as a load and biasing resistor, for the transistor 14 and for the diode 18 respectively. However, such a high value in respect of the resistor 28 may cause excessively long damping, that is to say, the voltage $V_c$ taken an excessively long time, relative to the period of oscillation, to reach the value $V_A$; that limits the rate of repetition of the printing cycles. In order to be able to make maximum use of the speed characteristics of the circuit, the solution shown in FIG. 6 may be adopted. This shows part of the circuit of FIG. 3, in which a circuit branch 42 comprising a diode 43 with a series resistor 44 has been added. The resistance of the resistor 44 is between 1 and 5 KΩ but is not higher than a critical value $$R_c = 2\sqrt{\frac{L}{C}},$$

in which L is the value of the inductor 22 (see FIG. 1) and C is the capacitance of the transducer 10. With the values of L and C indicated above, the value of $R_c$ is 3.2 KΩ. Assuming in particular that the values of the resistors 28' and 33 (see FIG. 6) are 200 K and 2.7 KΩ respectively, there is obtained a period of time $T_3-T_2$ which exceeds the period of time $T_2-T_1$ by not more than about 18%.

Figure 1:
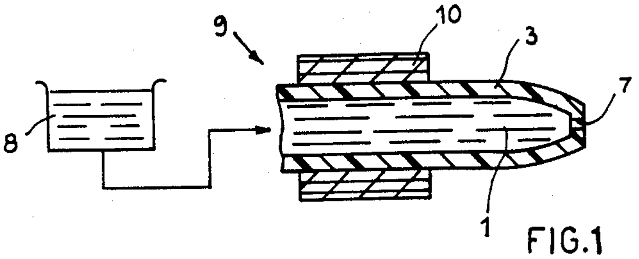
FIG. 1 shows an ink jet printing head for the control system according to the invention.
Figure 2:
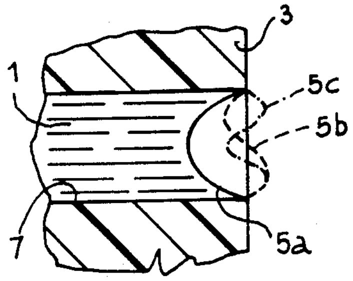
FIG. 2 is a diagrammatic view on a greatly enlarged scale of the meniscus of ink in the nozzle.

As already stated above, the voltage at the ends of the transducer 10 varies continuously throughout the excitation period $T_3-T_o$ (see FIG. 1). That is a very important result in relation to the dynamic behaviour of the meniscus of the nozzle 7 (FIG. 2) and for the correct formation and discharge of a drop of ink. In actual fact, the continuous variation in the voltage at the ends of the transducer 10, in accordance with switching of the diode 18, results in a continuous variation in the level of pressure within the container 3, in going from a decompression state to a compression stage (curve P in FIG. 4). The pressure wave P which causes the discharge of a drop of ink from the nozzle 7 (see FIG. 1) is substantially a complete sinusoidal wave which is connected at the beginning i and at the end f to a positive pressure value $P_o$, which is due to the effect of the voltage $V_A$ on the transducer 10.

The pressure in the container 3 varies proportionately to the derivative with respect to time of the voltage applied to the transducer 10 or, in other words, the pressure wave is coherent with the derivative with respect to time of the voltage wave applied to the transducer 10. As a result, the pressure in the compression phase $T_2-T_1$ (see FIG. 4) rises to a value which is about double the value of the pressure attained in the preceding expansion phase $T_1-T_o$. That makes it possible, in the compression phase, to produce a pressure which is sufficiently high to expel, from the nozzle 7 (see FIG. 1), a drop of ink such as to leave on the carrier 25 (see FIG. 3) a trace or mark suitable for producing high-quality printing without, in the preceding expansion phase, the pressure falling to an excessively low value which could cause disturbing phenomena, such as cavitation in the ink. The continuous variation in the pressure also avoids the generation of parasitic pressure waves at frequencies higher than the fundamental frequency of vibration of the meniscus. In particular, the second-harmonic oscillations which are the most dangerous, as has already been stated above, insofar as they cause a substantial deviation in the path of flight of the drop expelled from the nozzle 7, are minimised. FIG. 5 shows the frequency spectrum of the pressure wave P (see FIG. 4) which is generated by the circuit shown in FIG. 3, measured on a head of the type shown in FIG. 1. Because of the junctions i and f (see FIG. 4), the pressure wave P is composed of a primary sinusoidal wave and a multiplicity of sinusoidal waves of frequencies lower and higher than the frequency of the primary wave. The ordinate indicates the percentage ratio of the amplitude of all the sinusoidal waves making up the pressure wave P (see FIG. 4) with respect to the amplitude of the primary component wave, while the absciasa indicates frequency. The fundamental frequency of vibration of the meniscus 5 in the nozzle 7 of a head of the type shown in FIG. 1 depends on the geometrical characteristics of the nozzle 7 and the physical characteristics of the ink. Such a frequency, in the nodal circle mode, is of the order of 15–20 KHz. The oscillator circuit according to the invention, as illustrated in FIG. 3, is so designed that the frequency (FIG. 5) generated by the pressure wave P presents a maximum at the nodal circle frequency of the meniscus 5, while it drops rapidly for frequencies higher than that value. In actual fact, FIG. 5 shows that, in the above-mentioned frequency range, only the first mode of vibration of the oscillations generated by the circuit shown in FIG. 1 is excited, while the amplitude of the oscillation generated by the same circuit is entirely negligible within frequencies of 40 KHz corresponding to the frequencies of the second vibration mode of the meniscus 5, whereby vibrations of the meniscus in the 'nodal diameter' mode are not excited. Therefore, the meniscus in the nozzle 7 (see FIG. 1) vibrates substantially at its nodal-circle fundamental frequency of about 18 HKz (see FIG. 5), retaining the shape 5*a* unaltered (FIG. 1). Therefore, each drop of ink is discharged coaxially with respect to the axis of the nozzle 7, without satellite drops being formed. It will be appreciated that the control system for a head for an ink jet printer as described may be the subject of various modifications, without departing from the scope of the invention.

Figure 7:
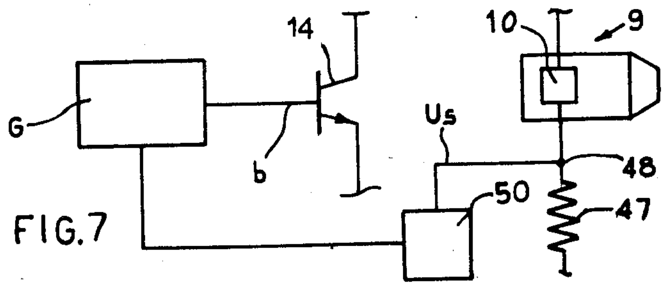
FIG. 7 is a view of part of another alternative embodiment of the circuit shown in FIG. 1

For example (see FIG. 7), in order to automate the interruption in the control signal 12 which is generated by the generator G (see FIG. 3) at the time $T_1$, a resistor 47 is connected in series with the transistor 10. The oscillating current I of the oscillator circuit LC therefore flows through the resistor 47, whereby a voltage $V_s$ proportional to the current I is generated at one end 48 of the resistor 47. A zero detector 50 of known type is disposed between the end 48 and the circuit G. The detector 50 detects when the voltage $V_s$ passes through zero and accordingly switches the generator G off precisely at the moment $T_1$ at which the current I goes to zero.

Figure 8:
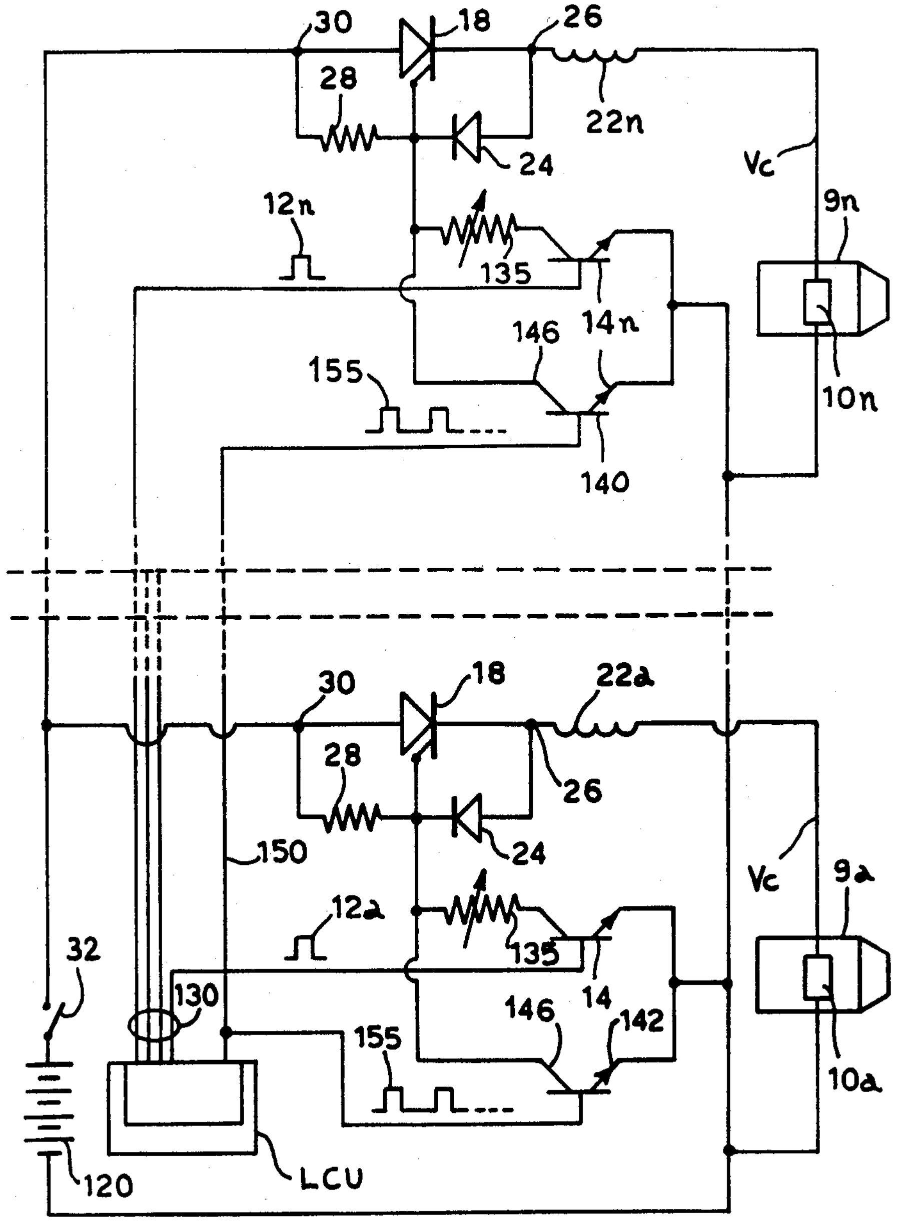
FIG. 8 is a diagrammatic view showing an application of the control system according to the invention to multiple heads.

In accordance with another embodiment of the invention, the circuit shown in FIG. 3 may be applied to a printer having a plurality of nozzles 9*a* . . . 9*n* (see FIG. 8). Each of the heads 9*a* . . . 9*n* is activated by a circuit similar to that shown in FIG. 3; a single supply voltage source 120 feeds in parallel all the pilot control circuits of the heads 9*a* . . . 9*n* in FIG. 8 in which the same references as those used in FIG. 3 are retained.

A logic control unit LCU including an arhythmic pulse generator G selectively feeds pulses 12*a* . . . 12*n* which are suitably out-of-phase in respect of time, by way of a bus 130, to the transistors 14 for printing the characters in accordance with a predetermined dot matrix, in known manner. Since the electrical characteristics of the inducators 22*a* . . . 22*n* and the capacitances of the transducers 10*a* . . . 10*n* may vary by virtue of manufacturing tolerances, the voltage $V_c$ applied to each transducer 10*a* . . . 10*n* in operation of the arrangement may vary. Consequently, each head 9*a* . . . 9*n* will emit the drops of ink at speeds which vary from one drop to another, thereby detrimentally affecting the quality of the printing produced.

In order to remedy that disadvantage, a variable resistor 135 is disposed in series with the respective collectors 138 of the transistors 14. The value of the resistor 135 is between 0.5 and 1.5 KΩ and, in order to facilitate calibration of the voltage $V_c$, the resistor is advantageously in the form of a potentiometer. For example, when the value of the potentiometer 135 is 1.5 KΩ, the variation in the voltage $V_c$ is from a minimum of about $-0.8V_A$ to a maximum of about $+2.4V_A$, $V_A$ being the value of the supply voltage. The inclusion of the resistor 135 does not change the mode of oscillation of the voltage $V_C$ in any of the n control circuits shown in FIG. 8. The voltage $V_C$ still oscillates with a sinusoidal characteristic which is substantially similar to that shown in FIG. 4 and which has no even higher-order harmonics, such as, as already described above, to cause the menisci in the nozzles of the heads 9*a* . . . 9*n* to vibrate, at the nodal diameter vibration frequency.

In a similar manner to the foregoing description relating to the multiple head circuit shown in FIG. 8, it will be appreciated that a variable resistor 136 may also be disposed in series with the transistor 14 in the circuit for a single head 9 as shown in FIG. 3.

In that way, it is possible to vary the speed of emission of the drops of ink in order to achieve suitable accord between the speed of the drops of ink and the speed of translatory movement of the head 9 along the support 25.

When printing is resumed after prolonged stoppages, for example after a weekend, the ink 1 (see FIG. 1) in the nozzle 7 may have partially dried out and may give rise to irregularities in the expulsion of the drops of ink from the nozzle. In order to free the nozzle 7 of any deposits of hardened ink before initiating the printing operation, a series of oscillations of voltages $V_c$ at the maximum value permitted, in relation to the supply voltage $V_A$ used, is applied to the transducer 10 of each head 9*a* . . . 9*n*.

In that way, any drops of ink are discharged from the nozzles at the maximum possible level of energy, whereby any dry ink residues are carried away and the nozzles are again ready for the printing operation.

For that purpose, a transistor 140 is disposed in parallel with the resistor 14 and the resistor 135 in each of the circuits for control of the heads 9*a* . . . 9*n* (see FIG. 8). The transistor 140 has its emitter 142 connected to the negative terminal of the voltage source 120 and its collector 146 connected to the electrode 16 of the controlled diode 18. By means of a wire 150, the unit LCU supplies each transistor 140, and only that transistor, with a train of pulses 155 for successively energising the heads 9*a* . . . 9*n* a certain number of times, in order to effect the operation of cleaning the nozzles.

During the normal printing mode of operation, the transistors 140 remain constantly de-energised and the unit LCU controls the transistors 14.

I claim:

1. A control system for a selective ink jet printing element operating through a nozzle (7) of a container (3) actuated by a piezoelectric transducer (10), the system comprising an oscillatory circuit (22, 10) including the transducer (10) and an arhythmic pulse generator (G) for selectively exciting the oscillatory circuit, characterised by circuit means (15, 24, 28) causing the oscillatory circuit (22, 10) to generate in response to each exciting pulse (12) a single oscillation wherein both the voltage ($V_c$) and current (I) value and their derivatives with respect to time vary continuously, whereby the formation of harmonics in the oscillatory circuit is substantially excluded.

2. A system according to claim 1, wherein the ink is expelled from the nozzle (7) by a pressure wave (P) which is coherent with the derivative of the voltage value ($V_c$), characterised in that the oscillatory circuit (22, 10) and circuit means (15, 24, 28) are so designed that the frequency spectrum of the pressure wave falls rapidly for frequencies higher than the resonance frequency of the oscillatory circuit.

3. A system according to claim 2, wherein the meniscus of the ink in the nozzle (7) has a predetermined resonance frequency at its second order nodal diameter mode of vibration, characterised in that the oscillatory circuit (22, 10) and circuit means (15, 24, 28) are so designed that the resonance frequency of the oscillatory circuit is substantially lower than this predetermined nodal-diameter frequency.

4. A system according to claim 3, characterised in that the frequency spectrum has a node in the vicinity of the predetermined nodal-diameter frequency.

5. A control system for a selective ink jet printing element with a nozzle in a container actuated by a piezoelectric transducer, the system comprising a resonant circuit including the transducer, a voltage source for charging the resonant circuit, and a switching circuit responsive to a pulse to excite a short oscillation in the resonant circuit, characterized in that the switching circuit disconnects the source from the resonant circuit to discharge it and then reconnects it to the voltage source for re-charging the resonant circuit to a voltage higher than the charging voltage as the discharging current goes to zero, and in that a unidirectional damping circuit is connected in series with the source and resonant circuit to overdamp only the ensuing discharging current of the resonant circuit.

6. A system according to claim 1 characterized in that the frequency spectrum of the oscillation comprises a main peak of frequencies centered substantially on the fundamental nodal circle resonance frequency of the ink meniscus, minor peaks centered substantially between higher harmonics of the fundamental frequency of the ink meniscus, and troughs centered substantially on harmonics of the fundamentals frequency.

7. A control system for a selective ink jet printing element operating through a nozzle (7) of a container (3) actuated by a piezoelectric transducer (10), for communicating periodic variations in pressure to the ink, wherein the ink forms within the nozzle a meniscus having a given nodal-circle fundamental resonance frequency and a higher, first nodal-diameter frequency, the system comprises an oscillatory circuit (22, 10) including the transducer (10) and an arhythmic pulse generator (G) for selectively exciting the oscillatory circuit, characterised in that the oscillatory circuit (22, 10) is so designed as to oscillate at a fundamental frequency which is much lower than the said nodal-diameter frequency, and by circuit means (15, 24, 28) which cause the oscillatory circuit (22, 10) to generate in response to each exciting pulse (12) a single pressure oscillation (P) which is substantially without the frequencies higher than the nodal-circle resonance frequency, whereby the meniscus oscillates substantially only at the nodal-circle ressonance frequency.

8. A system according to claim 7, wherein the oscillatory circuit (22, 10) is normally connected to a dc voltage source (20) and in response to a pulse (12) from the pulse generator (G) firstly causes expansion and then compression of the container, characterised in that the single oscillation is established by a voltage value ($V_c$) which varies continuously from the supply voltage ($V_A$) to a value ($-V_A$) of opposite sign, in a first phase, and, in a subsequent phase, to a maximum value ($3V_A$) of the same sign, which is greater than the supply voltage, wherebt the oscillatory circuit generates by means of the transducer (10) a pressure wave (P) variable continuously about its initial value and corresponding to the voltage values of the oscillatory circuit, generating a single drop which is without anomalies.

9. A system according to claim 8, characterised in that the expansion and compression of the container (3) are of equal durations substantially equal to a half-period of the voltage oscillation ($V_C$).

10. A system according to claim 9, characterised in that the extreme values of the pressure wave (P) with respect to the initial value, which respectively correspond to the exapsnion and the compression, are in a ratio of about 1 to 2.

11. A system according to claim 8, characterised in that the circuit means comprise an electronic switch (15) which responds to the pulse (12) of the generator (G) to short circuit the oscillatory circuit (22, 10) and to cut the voltage source (20) out of the oscillatory circuit in the first phase of the oscillation.

12. A system according to claim 11 characterised in that the switch (15) is connected to the oscillatory circuit (22, 10) by means of a semiconductor component (24) for conducting the current during the first phase of the oscillation when the switch is actuated by the pulse (12) from the generator (G).

13. A system according to claim 11 characterised in that the electronic switch comprises a unidirectional electronic device (18) connected between the voltage source (20) and the oscillatory circuit (22, 10) and a transistor (14) controlled by a pulse, for again connecting the oscillatory circuit to the voltage source at the time at which the current goes to zero, whereby the frequency spectrum of the voltage wave falls rapidly for frequencies higher than the resonance frequency of the circuit.

14. A system according to claim 10, characterised in that the circuit means comprise an element (47) which is responsive to the current flowing in the oscillatory circuit (22, 10) for controlling the duration of the pulse (12) and thus disabling the switch (15) at the time at which the current goes to zero, whereby the oscillatory circuit is re-connected to the voltage source (20).

15. A system according to claim 14, characterised in that the said responsive element (47) comprises a resistor connected in series with the oscillatory circuit (22, 10) and capable of generating a voltage proportional to the current, and in that a zero detector (50) connected between the resistor and the pulse generator (G) conditions the generator to interrupt the pulse (12) at the time at which the curreng goes to zero.

16. A system according to claim 11, characterised by a damping circuit (24, 28 or 43, 44) connected with the switch (15) between the source (20) and the oscillatory circuit (22, 10) and operable to damp the oscillation when the electronic switch is disabled.

17. A system according to claim 16, characterised in that the damping circuit comprises a diode (24 or 43) in series with a damping resistor (28 or 44) having a value which is lower than a predetermined critical value dependent on the electrical characteristics of the oscillatory circuit (22, 10), whereby the duration of the damping action exceeds the duration of the compression by not more than a predetermined time.

18. A control system, for a plurality of printing elements (9a–9n), each comprising a piezoelectric element (10a–10n), including in a corresponding oscillatory circuit (22, 10), the arhythmic pulse generator (G) being capable of selectively exciting the oscillator circuits, characterised in that the control circuit of each printing element comprises individual circuit means for conditioning a corresponding oscillatory circuit to generate in response to each pulse a single oscillation in which both the voltage and current value and the derivatives with respect to time of said values vary continuously whereby the formation of harmonics in said oscillation circuit is substantially excluded.

19. A system according to claim 18, wherein a logic control unit (LCU) includes the arhythmic generator (G), characterised in that the circuit means comprise a unidirectional electronic device (18) normally connected to the voltage source (20) and to the oscillatory circuit (22, 10), first and second electronic switches (14, 140) connected to the electronic device and selectively activated by the arhythmic generator (G) to disconnect the voltage source from the oscillatory circuit and to short circuit the oscillatory circuit when they are activated by the pulses, during a first phase of the oscillation.

20. A system according to claim 19, wherein the oscillatory circuits have electrical characteristics which are different from each other, characterised in that the first switch (14) comprises an adjustable voltage-limiting element (135) for adjusting the amplitude of the oscillation of each oscillatory circuitry to compensate for the different electrical ahcaracteristics.

21. A system according to claim 7 or claim 18, characterised in that the circuit means comprise an element (136) which is adjustable so as to vary the amplitude of the oscillation of the circuit without substantially varying its frequency, whereby the speed of emission of the drops of ink can be arbitrarily modified.

22. A system according to claim 21, characterised in that the said element (136) comprises a variable resistor in series with the oscillatory circuit (22, 10) only during the first phase of the oscillation.

23. A system according to claim 22, characterised in that the variable resistor (136) is disposed in series with the switch.

24. A system according to claim 23, characterised in that the variable resistor is connected between the switch (14) and the semiconductor element (18) for controlling the current of the oscillatory circuit (22, 10) during said first phase of the oscillation.

25. A system according to claim 18, characterised in that, in order to render the speed and/or the size of the drops emitted by the various nozzles uniform, each oscillatory circuit comprises an individually adjustable element for modifying the amplitude of the oscillations of the various circuits independently of each other.

* * * * *